United States Patent
Kim et al.

(10) Patent No.: US 9,554,058 B2
(45) Date of Patent: Jan. 24, 2017

(54) METHOD, APPARATUS, AND SYSTEM FOR GENERATING HIGH DYNAMIC RANGE IMAGE

(71) Applicants: SAMSUNG ELECTRONICS CO., LTD., Suwon-si (KR); INHA Industry Partnership Institute, Incheon (KR)

(72) Inventors: Nak-hoon Kim, Suwon-si (KR); Byung-cheol Song, Seoul (KR); Jum-han Bae, Seongnam-si (KR)

(73) Assignees: SAMSUNG ELECTRONICS CO., LTD., Suwon-si (KR); INHA Industry Partnership Institute, Incheon (KR)

( * ) Notice: Subject to any disclaimer, the term of this patent is extended or adjusted under 35 U.S.C. 154(b) by 57 days.

(21) Appl. No.: 14/465,422

(22) Filed: Aug. 21, 2014

(65) Prior Publication Data

US 2015/0092075 A1 Apr. 2, 2015

(30) Foreign Application Priority Data

Sep. 27, 2013 (KR) .................. 10-2013-0115699

(51) Int. Cl.
  *H04N 5/235* (2006.01)
  *G06T 5/50* (2006.01)
  *H04N 5/232* (2006.01)
  *H04N 5/355* (2011.01)
  *G06T 5/00* (2006.01)

(52) U.S. Cl.
  CPC .............. *H04N 5/2355* (2013.01); *G06T 5/50* (2013.01); *H04N 5/23254* (2013.01); *H04N 5/23267* (2013.01); *H04N 5/35581* (2013.01); *G06T 5/003* (2013.01); *G06T 2207/20208* (2013.01)

(58) Field of Classification Search
  CPC .............. H04N 5/2258; H04N 5/23251; H04N 5/23254; H04N 5/23264; H04N 5/23267; H04N 5/2355; G06T 5/003; G06T 5/50
  See application file for complete search history.

(56) References Cited

U.S. PATENT DOCUMENTS

| | | | |
|---|---|---|---|
| 8,184,919 B2 | 5/2012 | Ward | |
| 2012/0105681 A1 | 5/2012 | Morales | |
| 2012/0288217 A1* | 11/2012 | Zhai | ............... G06T 5/50 382/294 |
| 2012/0307114 A1 | 12/2012 | Ward et al. | |
| 2014/0232929 A1* | 8/2014 | Ichikawa | ............. H04N 5/2355 348/362 |
| 2015/0312463 A1* | 10/2015 | Gupta | ............... H04N 5/23254 348/239 |

OTHER PUBLICATIONS

Hwann-Tzong Chen et al., "Tone Reproduction: A Perspective from Luminance-Driven Perceptual Grouping", International Journal of Computer Vision, 61 (1/2), pp. 73-96, 2005.

(Continued)

Primary Examiner — Daniel M Pasiewicz
(74) Attorney, Agent, or Firm — Sughrue Mion, PLLC

(57) ABSTRACT

There is provided a method of generating a high dynamic range (HDR) image, including obtaining an image sequence with similar exposure times, obtaining a plurality of still images with different exposure times, which temporally correspond to at least one image among the image sequence, and generating a matched image having an HDR from the plurality of still images by using the image sequence.

20 Claims, 3 Drawing Sheets

(56) References Cited

OTHER PUBLICATIONS

Jae Ho Jang et al., "Sub-Band Decomposed Multiscale Retinex with Space Varying Gain", School of Electrical Engineering & Computer Science and Department of Information Technology & Electronics Education, pp. 3168-3171, 2008.
Paul E. Debevec et al., "Recovering High Dynamic Range Radiance Maps from Photographs", University of California at Berkeley, 10 pages total, 1997.
Wei Yao et al., "Noise Reduction for Differently Exposed Images", Institute for Infocomm Research, pp. 917-920, 2012.
Li Xu et al., "Motion Detail Preserving Optical Flow Estimation", IEEE Transactions on Pattern Analysis and Machine Intelligence, vol. 34, No. 9, pp. 1744-1757, Sep. 2012.
Laurence Meylan et al., "High Dynamic Range Image Rendering with a Retinex-Based Adaptive Filter", IEEE Transactions on Image Processing, vol. 15, No. 9, pp. 2820-2830, Sep. 2006.
Kaiming He et al., "Guided Image Filtering", Department of Information Engineering et al., 14 pages total; 2010.
Yong Seok Heo et al., "Ghost-Free High Dynamic Range Imaging", Department of EECS and Samsung Advanced Institute of Technology, pp. 486-500, 2010.
Fredo Durand et al., "Fast Bilateral Filtering for the Display of High-Dynamic-Range Images", Laboratory for Computer Science, pp. 257-266, 2002.
Hyunchan Ahn et al., "Adaptive Local Tone Mapping Based on Retinex for High Dynamic Range Images", IEEE International Conference on Consumer Electronics (ICCE), pp. 153-156, 2013.

* cited by examiner

METHOD, APPARATUS, AND SYSTEM FOR GENERATING HIGH DYNAMIC RANGE IMAGE

RELATED APPLICATION

This application claims the benefit of Korean Patent Application No. 10-2013-0115699, filed on Sep. 27, 2013, in the Korean Intellectual Property Office, the disclosure of which is incorporated herein in its entirety by reference.

BACKGROUND

1. Field

One or more exemplary embodiments relate to a method, apparatus, and system for generating a high dynamic range (HDR) image, and more particularly, to a method, apparatus, and system for generating an HDR image from a plurality of images.

2. Description of the Related Art

A range of radiance that may be recognized by a camera is limited since an image may be displayed by 256 values of each RGB channel. However, a range of radiance in an actual environment is much larger.

In order to solve the limited range of radiance that may be recognized by a camera, an apparatus may capture a number of still images and may match the captured images to generate a high dynamic range (HDR) image.

However, when there is motion of an object among the still images, a ghost artifact may be generated in the generated HDR image due to the motion of the object.

SUMMARY

One or more exemplary embodiments include a method, apparatus, and system for generating a high dynamic range (HDR) image while minimizing generation of a ghost artifact that may be caused by a motion of an object included in the still images.

Additional aspects will be set forth in part in the description which follows and, in part, will be apparent from the description, may be known by one having ordinary skill in the art, or may be learned by practice of one or more exemplary embodiments.

According to one or more exemplary embodiments, a method of generating a high dynamic range (HDR) image includes obtaining an image sequence with similar exposure times, obtaining a plurality of still images with different exposure times, which temporally correspond to at least one image among the image sequence, and generating a matched image having an HDR from the plurality of still images by using the image sequence.

The generating of the matched image having an HDR from the plurality of still images by using the image sequence includes obtaining first motion information from the image sequence, obtaining second motion information of at least one still image among the plurality of still images based on the obtained first motion information, and generating the matched image having an HDR from which a ghost artifact of a predetermined region is removed based on the obtained second motion information of the at least one still image.

The obtaining second motion information of the at least one still image based on the obtained first motion information includes upscaling the obtained first motion information based on a resolution of the image sequence and a resolution of the still images.

A resolution of the image sequence is less than or equal to a resolution of the still images.

The image sequence and the still images are obtained from different lenses of a camera having a plurality of lenses.

The method of generating an HDR image further includes controlling brightness components of the plurality of still images based on a difference in brightness among the plurality of still images and determining a region in which a difference in pixel value among the plurality of still images is greater than or equal to a first reference value as an occlusion region by using the plurality of still images whose brightness components are controlled.

The determining may include determining a region in which a difference in pixel value among images included in the image sequence is greater than or equal to a second reference value as an occlusion region.

The method of generating an HDR image further includes correcting the determined occlusion region based on a difference in brightness among the plurality of still images, obtaining a camera response function (CRF) using a still image among the plurality of still images in which the occlusion region is corrected, obtaining a radiance of the still image in which the occlusion region is corrected by using the CRF, and generating the matched image to have the same resolution as that of the still image in which the occlusion region is corrected and an HDR by using the obtained radiance value.

In the obtaining of the matched image having the same resolution as that of the still image in which the occlusion region is corrected and an HDR by using the obtained radiance value, tone mapping is performed based on:

$$R_i(x, y) = m\log(L_g(x, y)) - m\log(H_i(x, y)),$$

$$m\log(Z) = \begin{cases} \dfrac{TH\log(w_l + Z + 1)}{\log(w_l + TH + 1)} & \text{if } Z < TH \\ 255 - \dfrac{(255 - TH)\log(w_l - Z + 256)}{\log(w_l - TH + 256)}, & \text{otherwise} \end{cases},$$

$$\overline{R}_i(x, y) = \begin{cases} R_1(x, y) & \text{if } i = 1 \\ R_i(x, y) - R_{i-1}(x, y) & \text{otherwise} \end{cases},$$

$$g_i(x, y) = \left(\dfrac{1}{NR_i(x, y) + \varepsilon_g}\right)^{1-\gamma_i},$$

where $$NR_i(x, y) = \dfrac{\overline{R}_i(x, y)}{\max(\overline{R}_i)},$$

$$R(x, y) = \sum_{i=1}^{N_b} g_i(x, y)\overline{R}_i(x, y),$$

$$R'(x, y) = 255\dfrac{R(x, y) - R_{min}}{R_{max} - R_{min}}.$$

The method may be embodied in a program stored on a non-transitory computer recording medium.

According to one or more exemplary embodiments, an apparatus includes a capturing unit configured to obtain an image sequence with similar exposure times and to obtain a plurality of still images with different exposure times, which temporally correspond to at least one image among the image sequence and a controller configured to generate a matched image having an high dynamic range (HDR) from the plurality of still images by using the image sequence.

The controller may be further configured to obtain first motion information from the image sequence, obtain second motion information of at least one still image among the plurality of still images based on the obtained first motion information, and generate the matched image having an HDR from which a ghost artifact of a predetermined region is removed based on the obtained second motion information of the at least one still image.

The controller may be further configured to upscale the obtained first motion information based on a resolution of the image sequence and a resolution of the still images.

A resolution of the image sequence may be less than or equal to a resolution of the still images.

The image sequence and the still images may be obtained from different lenses of a camera having a plurality of lenses.

The controller may be further configured to control the brightness components of the plurality of still images based on a difference in brightness among the plurality of still images and determine a region in which a difference in pixel value among the plurality of still images is greater than or equal to a first reference value as an occlusion region by using the plurality of still images whose brightness components are controlled.

The controller may be further configured to determine a region in which a difference in pixel value among images included in the image sequence is greater than or equal to a second reference value as an occlusion region.

The controller may be further configured to correct the determined occlusion region based on a difference in brightness among the plurality of still images, obtain a camera response function (CRF) by using a still image among the plurality of still images in which the occlusion region is corrected, obtain a radiance of the still image in which the occlusion region is corrected by using the CRF, and generate the matched image having the same resolution as that of the still image in which the occlusion region is corrected and an HDR using the obtained radiance value.

The controller may be further configured to perform tone mapping based on:

$$R_i(x, y) = m\log(L_g(x, y)) - m\log(H_i(x, y)),$$

$$m\log(Z) = \begin{cases} \dfrac{TH\log(w_l + Z + 1)}{\log(w_l + TH + 1)} & \text{if } Z < TH \\ 255 - \dfrac{(255 - TH)\log(w_l - Z + 256)}{\log(w_l - TH + 256)}, & \text{otherwise} \end{cases},$$

$$\overline{R}_i(x, y) = \begin{cases} R_1(x, y) & \text{if } i = 1 \\ R_i(x, y) - R_{i-1}(x, y) & \text{otherwise} \end{cases},$$

$$g_i(x, y) = \left(\dfrac{1}{NR_i(x, y) + \varepsilon_g}\right)^{1-\gamma_i},$$

where $$NR_i(x, y) = \dfrac{\overline{R}_i(x, y)}{\max(\overline{R}_i)},$$

$$R(x, y) = \sum_{i=1}^{N_b} g_i(x, y)\overline{R}_i(x, y),$$

$$R'(x, y) = 255\dfrac{R(x, y) - R_{min}}{R_{max} - R_{min}}.$$

According to one or more exemplary embodiments, a method of generating a high dynamic range (HDR) image includes capturing a sequence of images using substantially similar exposure settings; capturing a plurality of still images using substantially dissimilar exposure settings substantially simultaneously with the capturing of the sequence of images; and generating an HDR image from the plurality of the still images by using motion information obtained from the sequence of images.

The method may further include reducing an appearance of a ghost artifact of the HDR image based on the motion information obtained from the sequence of images.

According to one or more exemplary embodiments, an apparatus includes a camera; and a controller configured to control the camera to capturing a sequence of images using substantially similar exposure setting, to control the camera to capture a plurality of still images using substantially dissimilar exposure settings substantially simultaneous with the capturing of the sequence of images; and to generate a high dynamic range (HDR) from the plurality of the still images by using motion information obtained from the sequence of images.

The controller may be further configured to reduce an appearance of a ghost artifact of the HDR image based on the motion information obtained from the sequence of images.

According to an exemplary embodiment, a clearer HDR image may be generated by minimizing generation of a ghost artifact that may be caused when a plurality of images are matched in order to generate an HDR image.

BRIEF DESCRIPTION OF THE DRAWINGS

These and/or other aspects will become apparent and more readily appreciated from the following description of one or more exemplary embodiments, taken in conjunction with the accompanying drawings in which.

DETAILED DESCRIPTION

Figure 1:
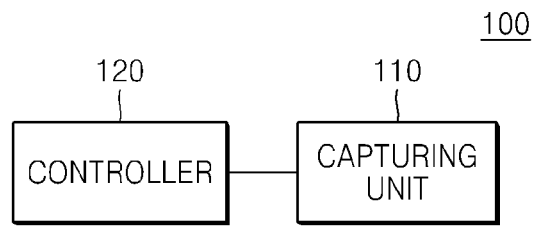
FIG. 1 is a block diagram of an internal structure of an apparatus according to an exemplary embodiment.

One or more exemplary embodiments now will be described more fully with reference to the accompanying drawings, in which exemplary embodiments of the present invention are shown. Detailed description of well-known functions and structures, which may blur a subject matter of the one or more exemplary embodiments, will be omitted in the following description and accompanying drawings. In addition, the same reference numerals in different drawings represent the same element.

The terms used in the present specification and claims should not be limitedly interpreted by common or dictionary meanings but should be interpreted to be suitable for the scope of the present invention based on the principle that the inventor may appropriately define his or her invention by optimal terms. The exemplary embodiments described in the present specification and the structures illustrated in the drawings are only examples and may have various equivalents and modifications.

The term 'image' used through the present specification may be used for describing various forms of video image information such as a 'picture', a 'frame', a 'field', and a 'slice'.

Hereinafter, exemplary embodiments will be described with reference to the accompanying drawings.

FIG. 1 is a block diagram of an internal structure of an apparatus 100 according to an exemplary embodiment.

Referring to FIG. 1, the apparatus 100 may include a capturing unit 110 and a controller 120. However, all the illustrated elements are not essential elements. The apparatus 100 may be implemented by more or fewer elements than the illustrated elements.

The capturing unit 110 may include one or more lenses (not shown) that may capture an external scene.

According to an exemplary embodiment, the capturing unit 110 may simultaneously capture two or more images by using the one or more lenses. A camera that has one or more lenses, each of which may capture a high or low quality image, may be referred to as an asymmetric camera. The capturing unit 110 simultaneously captures an image sequence and still images by using different lenses so that the controller 120 may generate a high dynamic range (HDR) image using the image sequence and the still images captured by the capturing unit 110.

The controller 120 may commonly control the whole operation of the apparatus 100. For example, the controller 120 may generate the HDR image by using the images captured by the capturing unit 110. That is, the controller 120 may entirely control the capturing unit 110.

The apparatus 100 may generate the HDR image from one or more still images with different exposure times. However, when there is a subject that moves during the exposure times, a ghost artifact may be generated. That is, when the subject that moves during the exposure times is included, since a latent image of the subject may be included in the image, the ghost artifact caused by the subject may be generated in the image. Although the still images are described as having different exposure times, this is merely an example of an exposure setting, and the still images may have the exposure settings which differ in alternative or additional ways, such as a focus setting.

Therefore, the apparatus 100 according to an exemplary embodiment may estimate motion information of the subject included in the still images by using the image sequence captured at the same point in time as the still images. The apparatus 100 may compensate for the motion of the subject by using the motion information obtained from the image sequence to remove the ghost artifact. That is, the apparatus 100 may remove the latent image of the subject in the images by using the motion information.

When one or more continuously captured images are matched, a time difference may be generated while the images are captured. When a motion of an object or a person is generated during the time difference, the ghost artifact may be generated in the matched image. When the ghost artifact is generated in the image, a region in which the moving object or person is displayed may widen or shake. In order to remove the ghost artifact of the image from the apparatus 100, it is necessary to obtain the motion information of the moving object or person to correctly detect the region in which the ghost artifact is generated. According to an exemplary embodiment, the apparatus 100 may obtain the motion information of the object or the person from the image sequence to remove the ghost artifact in the matched image.

The still images may include at least one still image with different exposure times obtained by capturing the external scene. Therefore, the still images may include saturation regions in accordance with the exposure times, respectively. Since a range of radiance that may be recognized by the capturing unit 110 of the apparatus 100 is much less than that in an actual environment, when the subject is photographed where an amount of light is not sufficient or too large, a brightness of the subject may exceed the range of radiance that may be recognized by the capturing unit 110. When the brightness of the subject exceeds the range of radiance that may be recognized by the capturing unit 110, since the brightness of the subject is not recognized as it is, the subject in the images may be displayed too bright or dark to be recognized.

Therefore, the capturing unit 110 may generate still images including saturation regions in which the brightness of the subject is not recognized as it is in an actual environment. For example, images with small exposure times may include regions saturated by dark colors with respect to dark regions. In addition, images with large exposure times may include regions saturated by bright colors with respect to bright regions.

However, the regions saturated to be dark in the images with the small exposure times may be displayed bright for times when the regions saturated to be dark are exposed in the images with the large exposure times. The regions saturated to be bright in the images with the large exposure times may be displayed dark for times when the regions saturated to be bright are exposed in the images with the small exposure times. Therefore, the apparatus 100 may generate the HDR image by using non-saturation regions of other still images that correspond to the saturation regions of the still images.

The still images may temporally correspond to at least one image included in the image sequence. That is, the still images may be captured at the same point in time as at least one image included in the image sequence.

The image sequence may include a moving image in which a predetermined scene is captured. The images included in the image sequence may have the same exposure time so that dynamic ranges of the images may be the same. When the images included in the image sequence include the same subject, the subject included in the images may have pixel values in the same range so that a moving subject of the image sequence may be detected. Therefore, the apparatus 100 may estimate motion information of the subject from the subject detected from the image sequence.

The still images and the scene included in the image sequence may include the same scene except the moving subject among the images. Therefore, the apparatus 100 may generate a matched image of the still images for generating the HDR image with respect to a region including the still external scene without removing the ghost artifact from the other still images with different exposure times.

The apparatus 100 may determine occlusion regions of the images by using the still images and the image sequence, in which the motion of the subject is compensated for. The occlusion regions may include partial regions in which the motion of the subject is not compensated for after motion compensation is performed based on the motion information. The apparatus 100 may obtain radiances of the regions of the images by using the still images in which the occlusion regions are compensated for and may generate the HDR image by using the obtained radiances. Therefore, since brightness components of the saturation regions included in the images may be controlled by the obtained radiance values, the subject included in the saturation regions may be recognizably displayed.

According to an exemplary embodiment, the apparatus 100 may not include the capturing unit 110 but may include only the controller 120. The apparatus 100 may receive the image sequence and the still images from an outside source and may generate the HDR image by using the received images.

Figure 2:
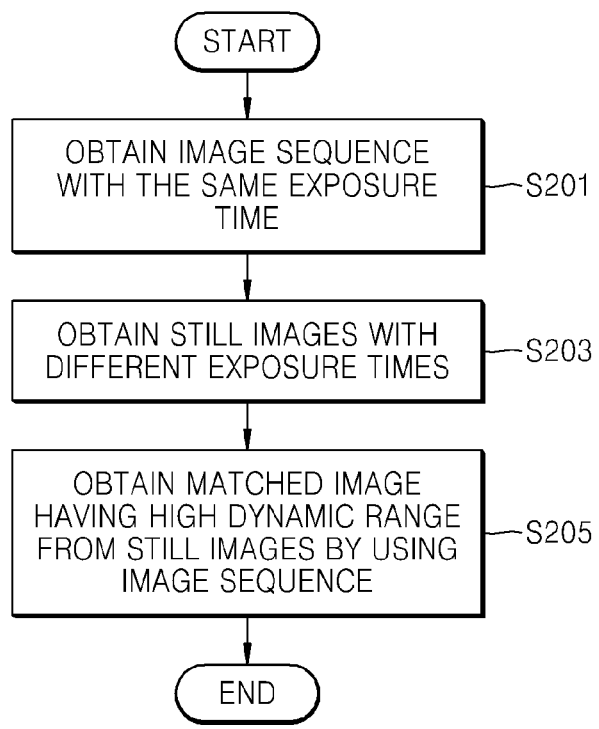
FIG. 2 is a flowchart of a method of generating a high dynamic range (HDR) image according to an exemplary embodiment.

FIG. 2 is a flowchart of a method of generating an HDR image, according to an exemplary embodiment.

Referring to FIG. 2, in operation S201, the apparatus 100 may obtain an image sequence in which brightness ranges of images are the same, that is, a moving image.

In addition, in operation S203, the apparatus 100 may obtain still images with different exposure times. Since the still images have different exposure times, the still images may have different brightness ranges. The image sequence and the still images may be captured at or near the same point in time. A ghost artifact that may be generated by a motion of a subject among the still images may be removed by the images of the image sequence.

In operation S205, the apparatus 100 may obtain an HDR-matched image from the still images by using the image sequence.

Since the images of the image sequence have the same exposure time so that pixel values of objects included in the images are not changed, a moving subject may be correctly detected from the image sequence. The apparatus 100 may obtain motion information of the subject from the image sequence and may remove the ghost artifact generated by the motion of the subject among the still images to generate a correctly matched image of the still images.

The apparatus 100 may obtain a radiance value by using the generated matched image and may generate the HDR image from the radiance value, which will be described in detail with reference to FIGS. 3 and 4.

Figure 3:
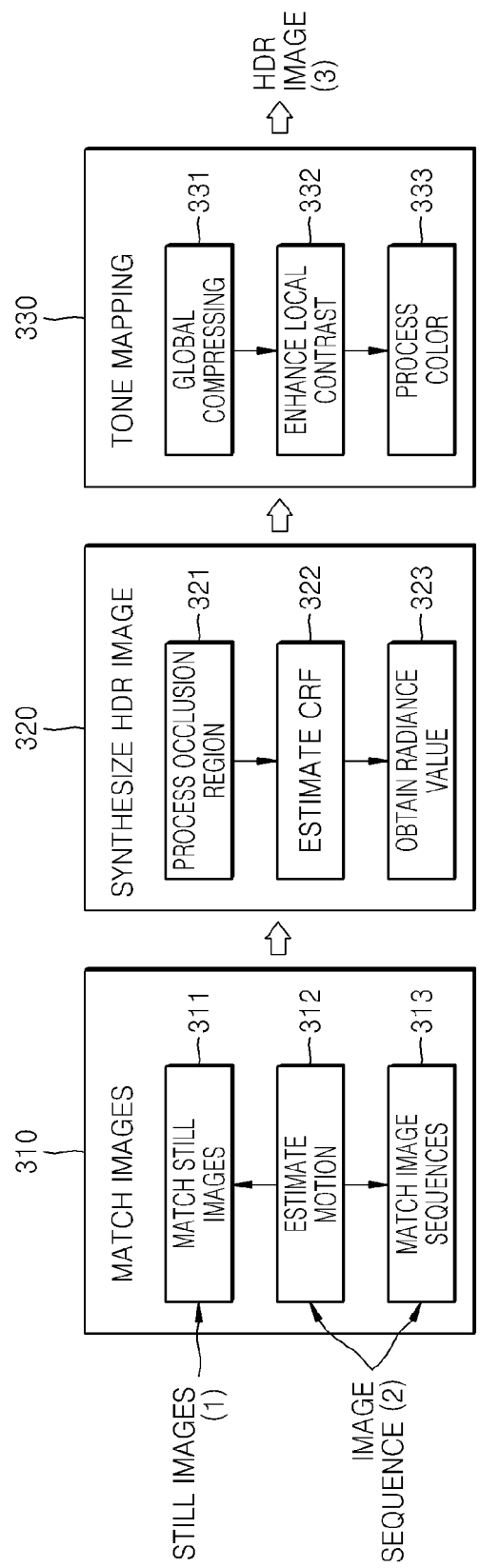
FIG. 3 is a block diagram illustrating a method of generating an HDR image according to an exemplary embodiment.

FIG. 3 is a block diagram illustrating a method of generating an HDR image, according to an exemplary embodiment.

A method of the apparatus 100 generating an HDR image, according to FIG. 3, includes an image matching operation 310, an HDR image synthesizing operation 320, and a tone mapping operation 330.

In the image matching operation 310, the apparatus 100 may obtain information on a motion of a subject among images by using still images 1 and an image sequence 2 and may generate a matched image from which a ghost artifact is removed based on the motion information.

Specifically, the apparatus 100 may obtain the still images to be used for generating an HDR image and images of the image sequence captured at or substantially near the same point in time, which may correspond to the still images. The apparatus 100 may obtain partial images of the image sequence corresponding to the still images to generate the HDR image.

The apparatus 100 may select images including the smallest saturation regions from the still images and the image sequence to set the images as target images. The apparatus 100 may generate the matched HDR image based on the target images and with reference to reference images.

For example, the apparatus 100 may set a still image with an intermediate exposure time as a target image $HR_t$ and may set an image of the image sequence corresponding to the target image $HR_t$ as a target image $LR_t$. In addition, the apparatus 100 may set a still image and an image of the image sequence, other than the target images, as reference images $HR_n$ and $LR_n$.

In the motion estimating operation 312, the apparatus 100 may estimate a motion of a subject among the images of the image sequence. At this time, the apparatus 100 may estimate the motion of the subject among the partial images corresponding to the still images. The apparatus 100 may estimate the motion of the subject by using an optical flow method or a block matching method.

In the still image matching operation 311, the apparatus 100 may obtain motion information of a subject of the still images by using information on the estimated motion of the subject among the images of the image sequence. For example, the apparatus 100 may obtain the motion information of the subject of the still images by upscaling the information on the estimated motion of the subject among the images of the image sequence.

$$MV_{HR_t} = \gamma \times MV_{LR_t} \quad \text{[EQUATION 1]}$$

In EQUATION 1, $MV_{HR_t}$ and $MV_{LR_t}$ may represent motion vectors of the image $HR_t$ and the image $LR_t$ and $\gamma$ may represent a ratio of the resolution of the still images to the resolution of the image sequence. At this time, the resolution of the image sequence may be less than or equal to the resolution of the still images.

The apparatus 100 may obtain the motion vector of the still images by interpolating the motion vector of the image sequence when the motion information of the image sequence is upscaled as defined by EQUATION 1. For example, the apparatus 100 may correct distortion that may be generated by enlarging the motion vector by estimating intermediate values of a continuous signal by using nearest neighbor interpolation.

The apparatus 100 may obtain a matched image of the still images, from which a ghost artifact generated by a motion of an object in the target image of the still images is partially removed, using the estimated motion vector $MV_{HR_t}$.

In addition, in the image sequence matching operation 313, the apparatus 100 may obtain a matched image of the images of the image sequence, from which a ghost artifact that may be generated in the target image of the image sequence is removed, using the estimated motion vector $MV_{LR_t}$. The ghost artifact that may be generated in the image sequence may be generated by shaking of a lens or the motion of the subject.

In the image matching operation 310, the apparatus 100 may obtain the matched image of the still images and the image sequence, in which the motion is compensated for in accordance with the motion vector.

In the image synthesizing operation 320, the apparatus 100 may obtain radiance values of the regions of the image by using the image matched in the image matching operation 310.

To be specific, in an occlusion region processing operation 321, the apparatus 100 may determine an occlusion region from the matched image of the still images and the image sequence. In the image matching operation 310, the occlusion region may include a partial region of the image, from which the ghost artifact is not removed. For example, when the image includes a motion that is not included in the motion information, a ghost artifact region generated by the corresponding motion may be determined as the occlusion region.

The occlusion region of the image sequence may be determined by determining whether a difference among pixel values of the reference image is not less than a reference value in the simply matched image. That is, it may be determined whether a difference value between the matched image of the image sequence, in which motion compensation is performed, and the target image is not less than the reference value. The occlusion region of the image sequence may be determined as defined by EQUATION 2.

$$\Delta_{LR_n}^k(x, y) = |LR_t^k(x, y) - LR_{n,reg}^k(x, y)|, \qquad \text{[EQUATION 2]}$$

where $k \in \{r, g, b\}$ $$C_{LR_n}(x, y) = \begin{cases} 0 & \text{if } \min\{\Delta_{LR_n}^k(x, y)\} < \tau_{LR} \\ 1 & \text{otherwise} \end{cases}$$

$C_{LR_n}$ an occlusion region of the reference image $LR_n$ of the image sequence. $\tau_{LR}$ as a reference value for determining the occlusion region of the image sequence may be arbitrarily determined. k that represents a color component may have values of r, g, and b. The occlusion region may be determined in each color component. k included in EQUATIONs to be described later may have the same meaning. Therefore, the image matching operation 310 and the HDR image synthesizing operation 320 in the present specification may be performed in each R, G, and B image.

$C_{LR_n}$ be upscaled to be suitable for the resolution of the still images. At this time, $C_{LR_n}$ be upscaled in accordance with the nearest neighbor interpolation like the motion vector.

In addition, occlusion regions may be determined in the still images. Since the images included in the image sequence have the same exposure time, contrast may be small in dark regions of the images. Therefore, in the dark region of the image sequence, although a ghost artifact is generated, a difference among pixel values is not large so that it may be difficult to detect the occlusion region. Therefore, according to the exemplary embodiment, the apparatus 100 may additionally determine the occlusion regions by using the still images.

Since the still images have different exposure times so that the still images have different brightness ranges, that is, dynamic ranges, the brightness ranges of the still images for determining the occlusion regions of the still images may be controlled to be uniform. When the brightness ranges of the images are different, since pixel values of the same object may vary in the images, it is difficult to detect an object that moves or shakes. Therefore, the brightness ranges of the images compared to determine the occlusion regions may be controlled to be uniform.

According to an exemplary embodiment, the apparatus 100 may use the following EQUATION 3 in order to control the brightness ranges of the still images to be uniform:

$$\Lambda_{i,j}^k(Z) = \frac{\sum_{(x,y) \in \Omega_i^k(Z)} HR_{j,reg}^k(x, y)}{|\Omega_i^k(Z)|}, \qquad \text{[EQUATION 3]}$$

where $\Omega_i^k(Z) = \{(x, y) \mid HR_i^k(x, y) = Z\}$

In EQUATION 3, $\Lambda_{i,j}^k(Z)$ may represent an intensity mapping function (IMF) for each pixel value of a jth still image with respect to an ith still image. IMF may represent an average of values of pixels of the jth still image positioned at the same coordinates as those of the ith still image with values Z. In addition, $|\Omega_i^k(Z)|$ may represent the number of atoms of a set $\Omega_i^k(Z)$.

The apparatus 100 may control the brightness ranges of the still images to be uniform using EQUATION 3 as defined by EQUATION 4.

$$\hat{HR}_n^k(x, y) = \begin{cases} \Lambda_{n,t}^k(HR_{n,reg}^k(x, y)), & \text{if } n < t \\ \Lambda_{t,n}^k(HR_t^k(x, y)), & \text{otherwise} \end{cases} \qquad \text{[EQUATION 4]}$$

$\hat{HR}_n^k$ represents $HR_n^k$ with a controlled brightness range. In controlling the brightness ranges of the still images, in order to detect regions saturated to be dark, the brightness ranges of the images with small exposure times may be controlled in accordance with the brightness ranges of the images with large exposure times.

In EQUATION 4, n represents an index of a reference image and t represents an index of a target image. At this time, the index of an image may have a value corresponding to an exposure time of the image. For example, the larger the index value of the image, the larger the exposure time of the image.

Referring to EQUATION 4, a brightness range of an image may be controlled in accordance with a brightness range of an image to be compared in each pixel of the image. According to EQUATION 4, an average of pixel values of a region of the image to be compared, which are the same as those of the image, may be determined as the pixel value of the image. That is, a pixel value with a brightness range controlled by the image to be compared may be determined in each image. When an exposure time of the reference image is less than that of the target image, a brightness range of the reference image may be controlled by that of the target image and, conversely, the brightness range of the target image may be controlled by that of the reference image.

The apparatus 100 may determine an occlusion region as defined by EQUATION 5 using $\hat{HR}_n^k$ determined in EQUATION 4.

$$C_{HR_n}(x, y) = \begin{cases} 0 & \text{if } \min\{\Delta_{HR_n}^k(x, y)\} < \tau_{HR} \\ 1 & \text{otherwise} \end{cases}, \qquad \text{[EQUATION 5]}$$

where $$\Delta_{HR_n}^k(x, y) = \begin{cases} |HR_t^k(x, y) - \hat{HR}_n^k(x, y)|, & \text{if } n < t \\ |HR_n^k(x, y) - \hat{HR}_n^k(x, y)|, & \text{otherwise} \end{cases}$$

In EQUATION 5, $C_{HR_n}$ represent an occlusion region of an nth still image. $\tau_{HR}$ as a reference value for determining the occlusion region of the still image may be arbitrarily determined. Referring to EQUATION 5, the occlusion regions of the still images may be determined by comparing the target image with the still images before the brightness ranges thereof are controlled.

Referring to EQUATION 5, when the exposure time of the reference image is less than that of the target image, the target image may be compared with the reference image whose brightness range is controlled by that of the target image so that the occlusion regions of the still images may be determined. In addition, when the exposure time of the reference image is greater than that of the target image, the reference image may be compared with the target image whose brightness range is controlled by that of the reference image.

The occlusion regions of the nth still image and the sequence image may be determined as the sum of the occlusion regions of the still images and the image sequence as defined by EQUATION 6.

$$C_n(x, y) = C_{LR_n}(x, y) \vee C_{HR_n}(x, y)$$

The occlusion region of the nth still image may be filled with an average of pixel values of a region of the reference image having the same pixel values as those of the target image as defined by EQUATION 7. Therefore, boundaries among the displayed pixel values are offset by the ghost artifact generated by shaking or the motion of the subject so that the ghost artifact of the occlusion region may be removed.

$$\overline{HR}_n^k(x, y) = \begin{cases} HR_n^k(x, y) & \text{if } C_n(x, y) = 0 \\ \Lambda_{t,n}^k(HR_t^k(x, y)) & \text{otherwise} \end{cases} \quad [\text{EQUATION 7}]$$

The apparatus 100 may perform the above-described processes in the occlusion region processing operation 321 to remove the ghost artifact of the occlusion region. Therefore, the apparatus 100 may prevent a dynamic range from being reduced by the ghost artifact when the HDR image is generated.

In a camera response function (CRF) estimating operation 322, the apparatus 100 may estimate the CRF by using the still images whose occlusion regions are processed through the following EQUATION 8:

$$Z=f(E\Delta t), f^{-1}(Z)=E\Delta t, \ln f^{-1}(Z)=\ln E+\ln \Delta t, h(Z)=\ln E+\ln \Delta t \quad [\text{EQUATION 8}]$$

E and Δt represent irradiance and an exposure time, respectively, and f represents CRF. $h(Z)=\ln E+\ln \Delta t$ may be obtained by performing a natural logarithm on $Z=f(E\Delta t)$. CRF may be estimated by estimating an h function.

The apparatus 100 may estimate h that minimizes a value of $O^k$ as defined by the following EQUATION 9 using the fact that radiance values are the same although the exposure times are different:

$$O^k = \qquad [\text{EQUATION 9}]$$

$$\sum_{y \in S} \sum_{n=1}^{N_i} w(\overline{HR}_n^k(x, y))\left[h^k(\overline{HR}_n^k(x, y)) - \ln E^k(x, y) - \ln \Delta t_n\right]^2 +$$

$$\lambda \sum_{z=1}^{254} w(Z)h''(Z)^2$$

$$w(Z) = \begin{cases} Z & \text{if } Z < 127.5 \\ 255 - Z & \text{otherwise} \end{cases}$$

At this time, $O^k$ and $h^k$ represent an objective function and an inverse CRF for each color channel and Z as a digital value may have an integer value between 0 and 255. A first term of the $O^k$ function as a limitation for satisfying EQUATION 8 is for minimizing errors of radiances of the still images. A second term of the $O^k$ function is for correcting a smoothness of an h curve.

w(Z) is made to have a larger weight toward 128 assuming that the reliability of a value of an intermediate region is greater than those of values of a dark region and a bright region in an image. The h function that minimizes the $O^k$ function using singular value decomposition (SVD) may be estimated.

In a radiance value obtaining operation 323, the apparatus 100 may obtain the radiance values of the still images by using the CRF estimated in the CRF estimating operation 322 by using the following EQUATION 10:

$$\ln E_n^k(x,y)=h^k(\overline{HR}_n^k(x,y))-\ln \Delta t_n \quad [\text{EQUATION 10}]$$

In $E_n^k$ may represent radiance values of the still images for a k color channel. Since the radiance values are sensitive to noise, the apparatus 100 may obtain a weight average of the radiance values of the still images to obtain final radiance as defined by EQUATION 11 in order to minimize an influence of the noise.

$$\ln E^k(x, y) = \frac{\sum_{n=1}^{N_i} w(\overline{HR}_n^k(x, y))(h(\overline{HR}_n^k(x, y)) - \ln\Delta t_n)}{\sum_{n=1}^{N_i} w(\overline{HR}_n^k(x, y))} \quad [\text{EQUATION 11}]$$

w(Z) of EQUATION 11 is the same as that of EQUATION 9. The apparatus 100 may obtain the weight average of the radiance values of the still images to reduce noise and to improve details of saturation regions.

In the tone mapping operation 330, the apparatus 100 may compress the radiance values to values between 0 and 255 in order to efficiently display the radiance values obtained in the HDR image synthesizing operation 320. The tone mapping operation 330 may include a global compressing operation 331, a local contrast enhancing operation 332, and a color processing operation 333.

In the global compressing operation 331, the apparatus 100 may compress the radiance values to the values between 0 and 255 as defined by EQUATION 12 based on the fact that a visual system of a camera senses light by using a logarithmic function.

$$L_g(x, y) = 255 \frac{\log(L(x, y)) - \log(L_{min})}{\log(L_{max}) - \log(L_{min})} \quad [\text{EQUATION 12}]$$

L(x,y) may represent the radiance values. The radiance values may be variously represented, for example, as defined by EQUATION 13.

$$L(x,y)=0.213E_r(x,y)+0.715E_g(x,y)+0.072E_b(x,y) \quad [\text{EQUATION 13}]$$

In the EQUATION 12, since the logarithmic function is used, contrast of an image may deteriorate.

In the local contrast enhancing operation 332, the apparatus 100 may use a sub band decomposed-multiscale retinex (SD-MSR) technique. First, the apparatus 100 may obtain $R_i(x,y)$ that is an ith single scale retinex (SSR) having $N_b$ bands as defined by EQUATION 14.

$$R_i(x, y) = m\log(L_g(x, y)) - m\log(H_i(x, y)), \quad [\text{EQUATION 14}]$$

$$m\log(Z) =$$

$$\begin{cases} \dfrac{TH\log(w_l + Z + 1)}{\log(w_l + TH + 1)} & \text{if } Z < TH \\ 255 - \dfrac{(255 - TH)\log(w_l - Z + 256)}{\log(w_l - TH + 256)}, & \text{otherwise} \end{cases}$$

Hi(x,y) is a resultant value obtained by performing guided filtering on Lg. The apparatus 100 may prevent a halo artifact around an edge by using a guided filter instead of a Gaussian transfer function.

TH is a threshold of m log and wl is a weight value for controlling linearity of the m log. As the wl increase, the m log is near to a straight line. The apparatus 100 may use the m log illustrated in EQUATION 14 to improve the contrast of a saturation region as well as that of a dark region.

When SSRs of all bands are obtained, sub-band decomposition may be performed as defined by EQUATION 15.

$$\overline{R}_i(x, y) = \begin{cases} R_1(x, y) & \text{if } i = 1 \\ R_i(x, y) - R_{i-1}(x, y) & \text{otherwise} \end{cases} \quad \text{[EQUATION 15]}$$

$\overline{R}_i(x, y)$ may represent sub-band decomposed SSR. After sub-bands are obtained, the apparatus 100 may set gains of bands as defined by EQUATION 16 in order to enhance details.

$$g_i(x, y) = \left(\frac{1}{NR_i(x, y) + \varepsilon_g}\right)^{1-\gamma_i}, \quad \text{[EQUATION 16]}$$

where $$NR_i(x, y) = \frac{\overline{R}_i(x, y)}{\max(\overline{R}_i)}$$

$g_i$ and $\gamma_i$ represent a gain of an ith band and a radius of the guided filter, respectively. $\varepsilon_g$ represents a detail parameter and may be arbitrarily set. Through the above process, the apparatus 100 may assign a larger gain to a region with a smaller SSR value to effectively improve the details.

When the gains are set, sub-band composition may be performed again as defined by EQUATION 17.

$$R(x, y) = \sum_{i=1}^{N_b} g_i(x, y)\overline{R}_i(x, y) \quad \text{[EQUATION 17]}$$

A composed image may be compressed to a value between 0 and 255 as defined by EQUATION 18.

$$R'(x, y) = 255 \frac{R(x, y) - R_{min}}{R_{max} - R_{min}} \quad \text{[EQUATION 18]}$$

In the color processing operation 333, when a brightness value is compressed, the apparatus 100 may restore the image to a color image by using a color value of radiance. At this time, since a ratio among color channels before the image is compressed is the same as that among color channels after the image is compressed, the following EQUATION 19 may be used:

$$\frac{E^k(x, y)}{L(x, y)} = \frac{R'^k(x, y)}{R'(x, y)} \quad \text{[EQUATION 19]}$$

$R'^k(x, y)$ represents a final resultant image, that is, a k color channel of the HDR image 3. When EQUATION 19 is arranged, EQUATION 20 may be obtained.

$$R'^k(x, y) = R'(x, y)\left(\frac{E^k(x, y)}{L(x, y)}\right) \quad \text{[EQUATION 20]}$$

The apparatus 100 may obtain $R'^k(x, y)$ for each color channel from EQUATION 20 to obtain the HDR image 3.

Figure 4:
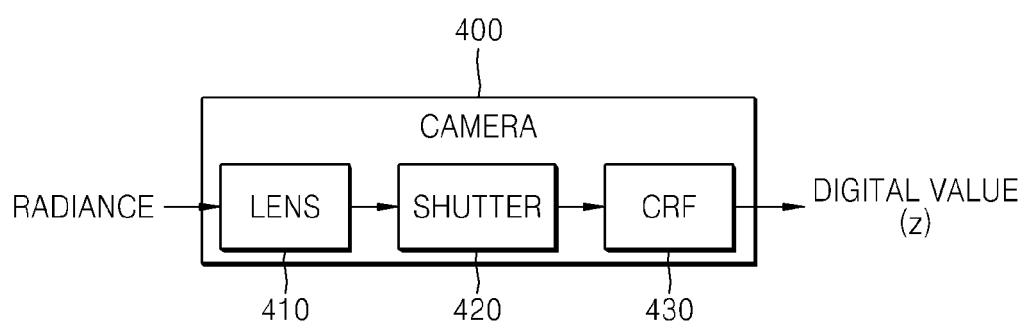
FIG. 4 is a block diagram illustrating a method of obtaining a camera response function (CRF) according to an exemplary embodiment.

FIG. 4 is a block diagram illustrating a method of obtaining a CRF according to an exemplary embodiment.

Referring to FIG. 4, a camera 400 may include a lens 410, a shutter 420, and a CRF 430. The camera 400 of FIG. 4 corresponds to the apparatus 100 and a repeated description thereof will be omitted.

The camera 400 may recognize radiances of objects through the lens 410 and may control an amount of light that enters the lens 410 by using the shutter 420 when an external scene is captured.

The CRF 430 may function in accordance with exposure times and radiances as described above. The light that enters the camera may be converted into the digital value Z by the CRF in accordance with the exposure times and the radiances.

Resultant values of the CRF are pixel values generated by a dynamic range of the camera lens changing a brightness level of natural light. The apparatus 100 correctly estimates the CRF 430 to estimate an inverse function of the CRF so that the brightness level of natural light may be output when the pixel values are input to the inverse function. When the CRF or the inverse function of the CRF is correctly estimated according to an exemplary embodiment, since an original dynamic range narrowed by a narrow band dynamic range of the camera lens may be estimated, the HDR image may be generated.

According to an exemplary embodiment, the ghost artifact that may be generated when the plurality of images are matched to generate the HDR image is minimized so that a clear HDR image may be generated.

One or more exemplary embodiments may be implemented as a computer (including all apparatuses having information processing functions) readable code in a recording medium readable by a computer. The computer-readable recording medium includes all kinds of recording apparatuses in which computer-readable data is stored. The computer-readable recording medium may be non-transitory and may include, for example, read only memory (ROM), random access memory (RAM), a CD-ROM, a magnetic tape, a floppy disk, and an optical data storage apparatus.

It should be understood that the exemplary embodiments described herein should be considered in a descriptive sense only and not for purposes of limitation. Descriptions of features or aspects within each exemplary embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope of the present invention as defined by the following claims.

What is claimed is:

1. A method of generating a high dynamic range (HDR) image, the method comprising:
   obtaining an image sequence including images having same exposure times;
   obtaining a plurality of still images with different exposure times, which temporally correspond to at least one of the images included in the image sequence;

generating a matched image of the plurality of the still images by using the image sequence;

determining an occlusion region from the matched image, based on a difference in pixel value among the plurality of still images and the matched image; and generating the HDR image from the matched image, wherein the HDR image includes a corrected occlusion region corresponding to the determined occlusion region.

2. The method of claim 1, wherein the generating of the matched image of the plurality of still images by using the image sequence comprises:

obtaining first motion information from the image sequence;

obtaining second motion information of at least one still image among the plurality of still images based on the obtained first motion information; and generating the matched image from which a ghost artifact of a predetermined region is removed based on the obtained second motion information of the at least one still image.

3. The method of claim 2, wherein the obtaining second motion information of the at least one still image based on the obtained first motion information comprises upscaling the obtained first motion information based on a resolution of the image sequence and a resolution of the still images.

4. The method of claim 1, wherein a resolution of the image sequence is less than or equal to a resolution of the still images.

5. The method of claim 1, wherein the image sequence and the still images are obtained from different lenses of a camera having a plurality of lenses.

6. The method of claim 1, wherein the determining the occlusion region from the matched image comprises:

controlling brightness components of the plurality of still images based on a difference in brightness among the plurality of still images; and determining a region in which the difference in pixel value among the plurality of still images is greater than or equal to a first reference value as the occlusion region by using the plurality of still images whose brightness components are controlled.

7. The method of claim 1, wherein the determining the occlusion region from the matched image comprises determining a region in which the difference in pixel value among images included in the image sequence is greater than or equal to a second reference value as the occlusion region.

8. The method of claim 6, further comprising:

correcting the occlusion region based on a difference in brightness among the plurality of still images;

obtaining a camera response function (CRF) using a still image among the plurality of still images in which the occlusion region is corrected;

obtaining a radiance of the still image in which the occlusion region is corrected by using the CRF; and generating the HDR image having the same resolution as that of the still image in which the occlusion region is corrected by using the obtained radiance value.

9. An apparatus comprising:

a camera configured to obtain an image sequence including images having same exposure times and to obtain a plurality of still images with different exposure times, which temporally correspond to at least one of the images included in the image sequence; and a computer configured to generate a matched image of the plurality of still images by using the image sequence, determine an occlusion region from the matched image based on a difference in pixel value among the plurality of still images and the matched image, and generate a high dynamic range (HDR) image from the matched image, wherein the HDR image includes a corrected occlusion region corresponding to the determined occlusion region.

10. The apparatus of claim 9, wherein the computer is further configured to obtain first motion information from the image sequence, obtain second motion information of at least one still image among the plurality of still images based on the obtained first motion information, and generate the matched image from which a ghost artifact of a predetermined region is removed based on the obtained second motion information of the at least one still image.

11. The apparatus of claim 10, wherein the computer is further configured to upscale the obtained first motion information based on a resolution of the image sequence and a resolution of the still images.

12. The apparatus of claim 9, wherein a resolution of the image sequence is less than or equal to a resolution of the still images.

13. The apparatus of claim 9, wherein the image sequence and the still images are obtained from different lenses of a camera having a plurality of lenses.

14. The apparatus of claim 9, wherein the computer is further configured to control the brightness components of the plurality of still images based on a difference in brightness among the plurality of still images and determine a region in which the difference in pixel value among the plurality of still images is greater than or equal to a first reference value as the occlusion region by using the plurality of still images whose brightness components are controlled.

15. The apparatus of claim 9, wherein the computer is further configured to determine a region in which the difference in pixel value among images included in the image sequence is greater than or equal to a second reference value as an occlusion region.

16. The apparatus of claim 14, wherein the computer is further configured to correct the occlusion region based on a difference in brightness among the plurality of still images, obtain a camera response function (CRF) by using a still image among the plurality of still images in which the occlusion region is corrected, obtain a radiance of the still image in which the occlusion region is corrected by using the CRF, and generate the HDR image having the same resolution as that of the still image in which the occlusion region is corrected using the obtained radiance value.

17. A method of generating a high dynamic range (HDR) image, the method comprising:

capturing a sequence of images using same exposure setting for the images;

capturing a plurality of still images using different exposure settings for the still images, wherein the capturing of the sequence of images and the capturing of the plurality of still images are simultaneous;

generating a matched image of the plurality of the still images by using motion information obtained from the sequence of images;

determining an occlusion region from the matched image based on a difference in pixel value among the plurality of still images and the matched image; and generating the HDR image from the matched image, wherein the HDR image includes a corrected occlusion region corresponding to the determined occlusion region.

18. The method of claim 17, further comprising:
reducing an appearance of a ghost artifact of the HDR image based on the motion information obtained from the sequence of images.

19. An apparatus comprising:
a camera; and
a computer configured to
control the camera to:
capture a sequence of images using same exposure setting for the images
capture a plurality of still images using different exposure settings for still images, wherein the camera capture the sequence of images and the plurality of still images simultaneously,
generate a matched image of the plurality of the still images by using motion information obtained from the sequence of images,
determine an occlusion region from the matched image, based on a difference in pixel value among the plurality of still images and the matched image, and
generate a high dynamic range (HDR) image from the matched image, wherein the HDR image includes a corrected occlusion region corresponding to the determined occlusion region.

20. The apparatus of claim 19, wherein the computer is further configured to reduce an appearance of a ghost artifact of the HDR image based on the motion information obtained from the sequence of images.

* * * * *